(12) United States Patent
Matsushita

(10) Patent No.: US 10,992,165 B2
(45) Date of Patent: Apr. 27, 2021

(54) REDUNDANT POWER SUPPLY SYSTEM

(71) Applicant: TOYOTA JIDOSHA KABUSHIKI KAISHA, Toyota (JP)

(72) Inventor: Naoto Matsushita, Okazaki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 275 days.

(21) Appl. No.: 16/281,563

(22) Filed: Feb. 21, 2019

(65) Prior Publication Data

US 2019/0312449 A1 Oct. 10, 2019

(30) Foreign Application Priority Data

Apr. 9, 2018 (JP) .............................. JP2018-074814

(51) Int. Cl.
*H02J 9/00* (2006.01)
*H02J 7/00* (2006.01)
*H02M 3/155* (2006.01)

(52) U.S. Cl.
CPC .............. *H02J 9/00* (2013.01); *H02J 7/0021* (2013.01); *H02J 7/0022* (2013.01); *H02M 3/155* (2013.01); *H02J 2007/0067* (2013.01)

(58) Field of Classification Search
CPC ...... H02J 7/0047; H02J 7/0048; H02J 7/0049; H02J 7/005; H02J 7/0013; H02J 7/0014; H02J 7/0016; H02J 7/0018; H02J 7/0019; H02J 7/0024; H02J 7/0025; H02J 7/007; H02J 7/0071; H02J 7/00711; H02J 7/00712; H02J 7/00714; H02J 7/00716; H02J 7/00718; H02J 7/007182; H02J 7/007184; H02J 7/007186; H02J 7/007188; H02J 7/00719; H02J 7/007192; H02J 7/007194; H02J 2207/20; H02J 9/00; H02J 2310/40;
(Continued)

(56) References Cited

U.S. PATENT DOCUMENTS 5,939,798 A * 8/1999 Miller .................... H02J 9/062
307/64
6,677,686 B1 * 1/2004 Phan ...................... H02J 1/108
307/12
(Continued)

FOREIGN PATENT DOCUMENTS

JP 2008-199763 A 8/2008
JP 2017-005783 A 1/2017

*Primary Examiner* — M Baye Diao
(74) *Attorney, Agent, or Firm* — Oliff PLC

(57) ABSTRACT

The redundant power supply system, in which a predetermined power is supplied via a first DC-DC converter (DDC) to a first battery and a first load of a primary system and the predetermined power is supplied via a second DDC to a second battery and a second load of a secondary system independent of the primary system, includes: a first switching element interposed between the second DDC and the second battery; a first diode which is connected in parallel to the first switching element and performs rectification in a direction from the second battery toward the second DDC; and a control section which turns off the first switching element when the second battery is in a first state where a stored power amount thereof is not smaller than a predetermined first threshold value, and turns on the first switching element when a state other than the first state is assumed.

12 Claims, 9 Drawing Sheets

(58) Field of Classification Search
CPC ...... H02J 1/102; H02J 1/08; H02J 7/34; H02J 9/06; H02M 3/155; Y02T 10/92; B60R 16/03
USPC .............................. 320/134; 307/43, 80, 82
See application file for complete search history.

(56) References Cited

U.S. PATENT DOCUMENTS

| | | | |
|---|---|---|---|
| 7,193,872 B2* | 3/2007 | Siri | H02M 3/33592 |
| | | | 363/95 |
| 7,446,432 B2* | 11/2008 | Cha | H02J 9/062 |
| | | | 307/64 |
| 8,053,927 B2* | 11/2011 | Hjort | H02J 9/062 |
| | | | 307/64 |
| 8,593,013 B2* | 11/2013 | Wang | H02J 9/061 |
| | | | 307/80 |
| 8,779,730 B2* | 7/2014 | Jiang-Hafner | H02M 7/483 |
| | | | 320/166 |
| 9,041,249 B2* | 5/2015 | Chan | H02J 1/00 |
| | | | 307/43 |
| 9,266,433 B2* | 2/2016 | Bilezikjian | B60L 3/04 |
| 9,337,715 B2* | 5/2016 | Kim | H02M 3/1584 |
| 9,755,561 B2* | 9/2017 | Jojima | H02J 7/0068 |
| 10,500,980 B2* | 12/2019 | Conlon | B60L 53/14 |
| 2002/0109406 A1* | 8/2002 | Aberle | B60L 58/33 |
| | | | 307/10.1 |
| 2007/0228834 A1* | 10/2007 | Hirahara | H02J 9/061 |
| | | | 307/66 |
| 2009/0243390 A1* | 10/2009 | Oto | H02J 7/34 |
| | | | 307/43 |
| 2010/0231178 A1* | 9/2010 | Handa | H02J 7/34 |
| | | | 320/163 |
| 2012/0043923 A1* | 2/2012 | Ikriannikov | H02J 1/10 |
| | | | 320/103 |
| 2012/0069604 A1* | 3/2012 | Yagyu | H02M 1/34 |
| | | | 363/20 |
| 2012/0235484 A1* | 9/2012 | Yamada | H02J 3/381 |
| | | | 307/43 |
| 2014/0021916 A1* | 1/2014 | Bilezikjian | B60L 53/14 |
| | | | 320/109 |
| 2014/0312861 A1* | 10/2014 | Kim | H02M 1/4225 |
| | | | 323/271 |
| 2016/0134160 A1* | 5/2016 | Schultz | H02J 7/0019 |
| | | | 307/66 |
| 2016/0204703 A1* | 7/2016 | Ishigaki | H02M 3/18 |
| | | | 307/43 |
| 2018/0219397 A1* | 8/2018 | Matsushita | B60L 58/12 |
| 2018/0334118 A1* | 11/2018 | Masui | H02J 7/00 |
| 2019/0283611 A1* | 9/2019 | Conlon | B60L 53/11 |
| 2021/0004065 A1* | 1/2021 | Chandra | |

* cited by examiner

REDUNDANT POWER SUPPLY SYSTEM

BACKGROUND OF THE INVENTION

Field of the Invention

The present invention relates to a redundant power supply system to be mounted to a vehicle.

Description of the Background Art

Patent document 1 (Japanese Laid-Open Patent Publication No. 2008-199763) discloses a power supply system which realizes a redundant configuration by being provided with: a first system and a second system in which power is supplied from a high-voltage power supply via DC-DC converters to a first battery and a second battery, respectively.

In a power supply system with a redundant configuration, it is desired that deterioration of a battery of one of systems is suppressed through management, with high accuracy, of the power storage state of the battery when the battery is used as a backup power supply for an important load in automatic driving.

Methods for suppressing the deterioration of a battery include a method in which the battery is prevented from being overcharged. A conceivable means for preventing a battery in a fully charged state from being overcharged is to, for example, disconnect the battery from a power-supplying line of a DC-DC converter. However, in this case, it becomes difficult to swiftly supply power from the battery to the power-supplying line when backup for the important load becomes necessary.

SUMMARY OF THE INVENTION

The present invention has been made in view of the aforementioned problem, and an object of the present invention is to provide a redundant power supply system including a battery that can be prevented from being overcharged and that can be caused to swiftly function as a backup power supply for an important load when necessary.

In order to solve the aforementioned problem, one aspect of the present invention is a redundant power supply system in which a predetermined power is supplied via a first DC-DC converter to a first battery and a first load of a primary system, and the predetermined power is supplied via a second DC-DC converter to a second battery and a second load of a secondary system independent of the primary system, the redundant power supply system including: a first switching element interposed between the second DC-DC converter and the second battery; a first diode connected in parallel to the first switching element and configured to perform rectification in a direction from the second battery toward the second DC-DC converter; and a control section configured to turn off the first switching element when the second battery is in a first state where a stored power amount thereof is equal to or larger than a predetermined first threshold value, and to turn on the first switching element when the second battery is in a state other than the first state.

In this redundant power supply system, on a path from the second DC-DC converter to the second battery, the first switching element and the first diode which performs rectification in the direction opposite to the path are provided, and, when the second battery is in the first state, the first switching element is turned off so that only a discharging path extending via the first diode is formed. By this control, the second battery in a fully charged state where the stored power amount thereof is equal to or larger than the first threshold value can be prevented from being overcharged, and the second battery can be caused to swiftly function as a backup power supply when necessary.

In addition, the redundant power supply system according to the one aspect may further include: a second switching element interposed between the second DC-DC converter and the second battery so as to be connected in series to the first switching element; and a second diode connected in parallel to the second switching element and configured to perform rectification in a direction from the second DC-DC converter toward the second battery, wherein the control section turns off the second switching element when the second battery is in a second state where the stored power amount thereof is equal to or smaller than a predetermined second threshold value which is smaller than the first threshold value, and turns on the second switching element when the second battery is in a state other than the second state.

In this redundant power supply system, on the path from the second DC-DC converter to the second battery, the second switching element and the second diode which performs rectification in the direction of the path are provided, and, when the second battery is in the second state, the second switching element is turned off so that only a charging path extending via the second diode can be formed. By this control, the second battery having a stored power amount that is reduced to be equal to or smaller than the second threshold value can be prevented from being overdischarged.

The redundant power supply system according to the above-described one aspect may further include: a power storage section; and a third DC-DC converter via which the second battery and the power storage section are connected to each other so as to be chargeable and dischargeable, wherein, in the first state where the first switching element is turned off, the control section causes the third DC-DC converter to discharge, with use of the power storage section, a part of power stored in the second battery, thereby determining a deterioration state of the second battery.

With the redundant power supply system according to this mode, the discharge can be performed with use of the power storage section without being influenced by a charging action performed on the second battery by the second DC-DC converter, whereby the deterioration state of the second battery can be accurately determined.

In addition, the redundant power supply system according to the above-described one aspect may further include a third DC-DC converter via which the second battery and the first battery are connected to each other so as to be chargeable and dischargeable, wherein, in the first state where the first switching element is turned off, the control section causes the third DC-DC converter to discharge, with use of the first battery, a part of power stored in the second battery, thereby determining a deterioration state of the second battery.

With the redundant power supply system according to this mode, the discharge can be performed with use of the first battery without being influenced by the charging action performed on the second battery by the second DC-DC converter, whereby the deterioration state of the second battery can be more accurately determined.

A structure in which the first switching element and the first diode are connected in parallel, and a structure in which the second switching element and the second diode are connected in parallel, may be each implemented by a field effect transistor having a body diode formed between a source and a drain.

Accordingly, each switching element and each diode can be formed as a single semiconductor element.

The present invention can realize a redundant power supply system including a battery that can be prevented from being overcharged and that can be caused to swiftly function as a backup power supply for an important load when necessary.

These and other objects, features, aspects and advantages of the present invention will become more apparent from the following detailed description of the present invention when taken in conjunction with the accompanying drawings.

DESCRIPTION OF THE PREFERRED EMBODIMENTS

Outline

In a redundant power supply system according to the present invention, a protective relay is provided between a DC-DC converter and a battery that serves as a backup power supply for automatic driving, and the state of the protective relay is appropriately switched on the basis of the power storage state of the battery, so that formation and disconnection of a charging path and a discharging path are controlled. Accordingly, the battery can be prevented from being overcharged or overdischarged.

First Embodiment

[Configuration]

Figure 1:
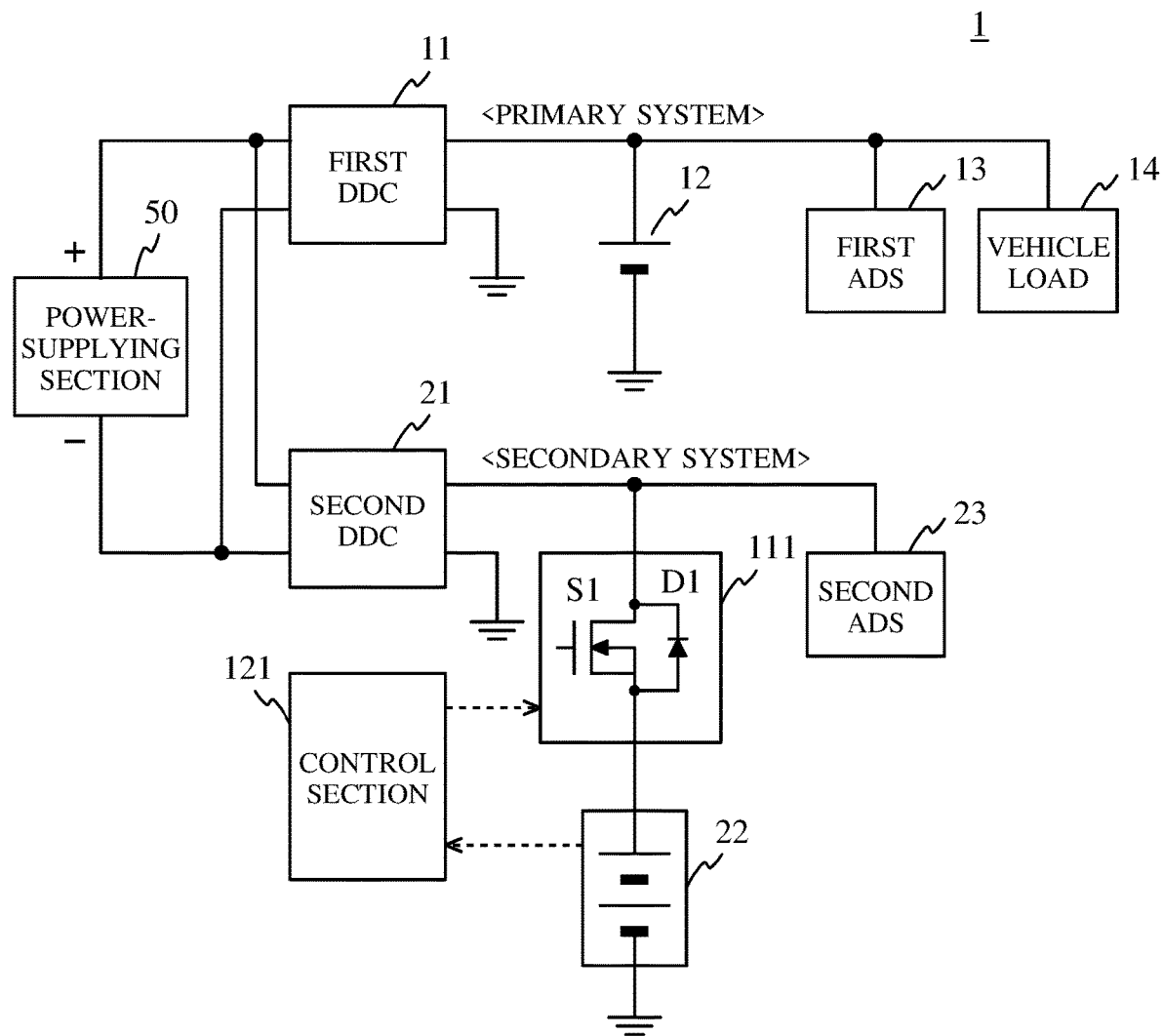
FIG. 1 is a block diagram indicating a schematic configuration of a redundant power supply system according to a first embodiment.

FIG. 1 is a block diagram indicating a schematic configuration of a redundant power supply system 1 according to a first embodiment of the present invention. The redundant power supply system 1 exemplified in FIG. 1 is composed of: a power supply device (primary system) including a first DC-DC converter (DDC) 11, a first battery 12, a first automatic driving system (ADS) 13, and a vehicle load 14; a power supply device (secondary system) including a second DC-DC converter (DDC) 21, a second battery 22, a second automatic driving system (ADS) 23, a battery protection circuit 111, and a control section 121; and a power-supplying section 50.

The redundant power supply system 1 is mounted to, for example, a vehicle capable of automatic driving by means of a device in the vehicle. In the redundant power supply system 1 mounted to the vehicle: during manual driving, the first battery 12 of the primary system is used for driving the vehicle; and, during automatic driving, not only the first battery 12 is used but also the second battery 22 of the second system can be used as a backup power supply for a case where, for example, the first battery 12 fails (fail-safe).

The power-supplying section 50 can supply power to the first DC-DC converter 11 of the primary system and the second DC-DC converter 21 of the secondary system which are connected in parallel. The power-supplying section 50 can be implemented by a high-voltage battery (vehicle-driving battery or the like), e.g., a lithium-ion battery, configured so as to be chargeable/dischargeable.

The first DC-DC converter 11 is configured to be able to convert power supplied from the power-supplying section 50 and output power, obtained by the conversion, to the first battery 12, the first automatic driving system 13, and the vehicle load 14. Specifically, the first DC-DC converter 11 steps down high-voltage power, supplied from the power-supplying section 50, so as to obtain low-voltage power, and outputs the low-voltage power to the first battery 12, the first automatic driving system 13, and the vehicle load 14.

The first battery 12 is a power storage element, e.g., a lead battery, configured so as to be chargeable/dischargeable. The first battery 12 is configured to be able to store (charge) power outputted from the first DC-DC converter 11, and output power stored by itself to the first automatic driving system 13 and the vehicle load 14.

The first automatic driving system 13 is a system including some loads that are allocated so as to be operated with the first battery 12 being used as a power supply, among loads required for automatic driving of the vehicle. Examples of the loads required for automatic driving include an automatic driving ECU (Electronic Control Unit), an electronic braking system (EBS), and an electric power steering (EPS).

The vehicle load 14 is at least one vehicle-mounted device that can be operated by power outputted from the first DC-DC converter 11 and/or power stored in the first battery 12. The vehicle load 14 is a load other than the loads required for automatic driving.

The second DC-DC converter 21 is configured to be able to convert power supplied from the power-supplying section 50, and output power, obtained by the conversion, to the second battery 22 and the second automatic driving system 23. Specifically, the second DC-DC converter 21 steps down high-voltage power, supplied from the power-supplying section 50, so as to obtain low-voltage power, and outputs the low-voltage power to the second battery 22 and the second automatic driving system 23.

The second battery 22 is a power storage element, e.g., a lead battery or a lithium-ion battery, configured so as to be chargeable/dischargeable. The second battery 22 is configured to be able to store (charge), via the battery protection circuit 111, power outputted from the second DC-DC converter 21, and output power stored by itself, via the battery protection circuit 111 to the second automatic driving system 23. The second battery 22 functions as a backup power supply when, for example, the first battery 12 fails while the vehicle is running by automatic driving.

The second automatic driving system 23 is a system including some loads that are allocated so as to be operated with the second battery 22 being used as a power supply, among the loads required for automatic driving of the vehicle. The loads included in the second automatic driving system 23 are important loads required for automatic driving and each having a function to cause the vehicle to safely perform evacuation operation by means of supply of power from the secondary system in a case of emergency such as a case where supply of power from the primary system is failed.

The battery protection circuit 111 is a relay circuit that is interposed between the second DC-DC converter 21 and the second battery 22 and that is for preventing the second battery 22 from being overcharged. The term "overcharged" refers to a state where the second battery 22 is further charged from a fully charged state where the stored power amount of the second battery 22 is equal to or larger than a predetermined first threshold value.

The battery protection circuit 111 is composed of: a switching element S1 interposed between the second DC-DC converter 21 and the second battery 22; and a diode D1 which is connected in parallel to the switching element S1 and which performs rectification in a direction from the second battery 22 toward the second DC-DC converter 21. In response to control by the control section 121, the switching element S1 performs switching between the state of an ON operation (conduction) and the state of an OFF operation (non-conduction). In FIG. 1, as the battery protection circuit 111, an N-channel type MOSFET (field effect transistor) having a body diode formed between the source and the drain is used, for example.

The control section 121 is implemented by, for example, a microcomputer. The control section 121 can monitor the power storage state of the second battery 22 by sensing a voltage, a temperature, or the like, and control the ON and OFF operations of the battery protection circuit 111 as follows on the basis of this power storage state.

[Control]

Figure 2A:
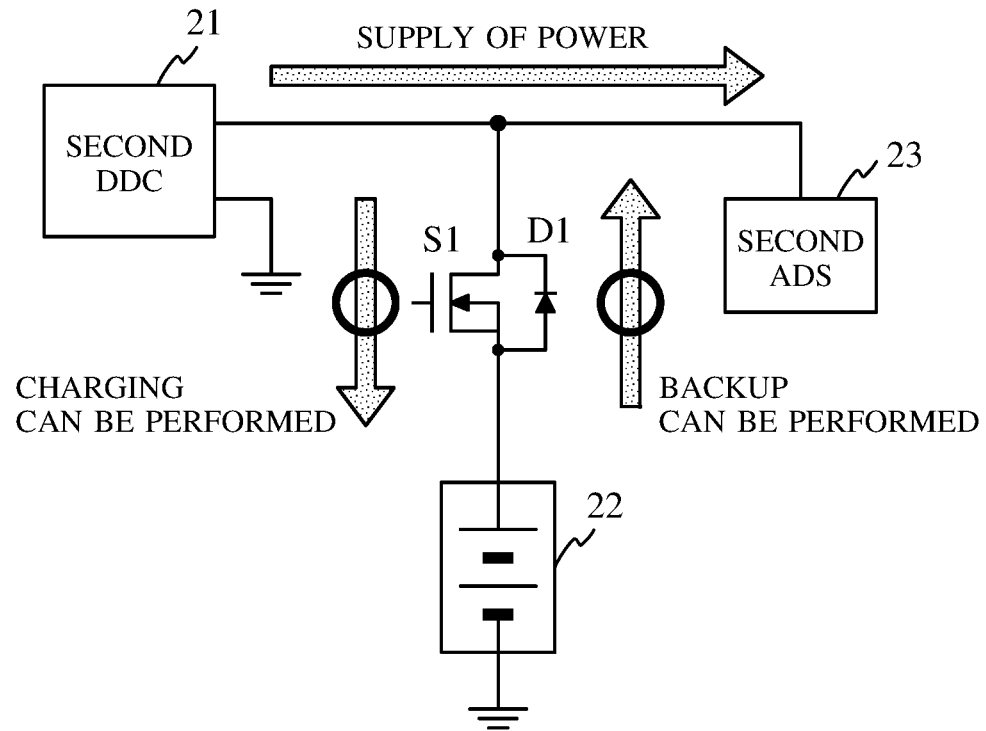
FIG. 2A and FIG. 2B are diagrams for explaining states of a battery protection circuit controlled by a control section in FIG. 1.
Figure 2B:
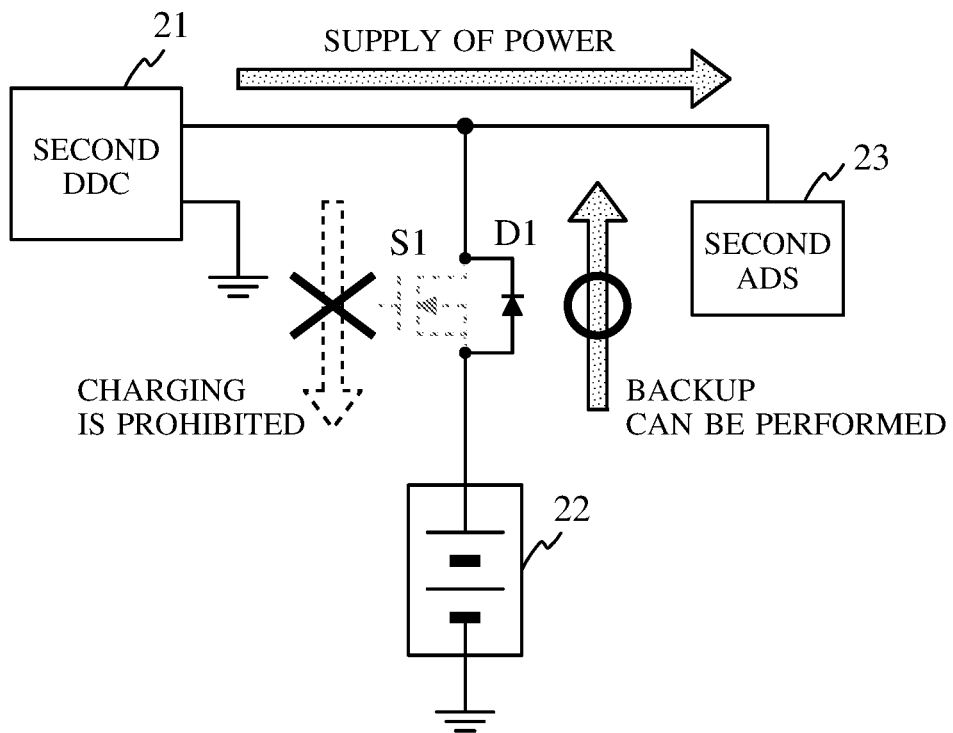

Next, control by the secondary-system power supply device of the redundant power supply system 1 according to the first embodiment will be described also with reference to FIG. 2A and FIG. 2B. FIG. 2A and FIG. 2B indicate states of the battery protection circuit 111 controlled by the control section 121 which is not shown therein.

FIG. 2A indicates a case where the second battery 22 is in a normal state in terms of the stored power amount thereof. The normal state refers to a state which is not a first state described later. In this normal state, the switching element S1 is controlled by the control section 121 so as to be subjected to the ON operation. In this control state, power outputted from the second DC-DC converter 21 is supplied to the second automatic driving system 23, and is used for charging the second battery 22 (charging can be performed). In addition, in this control state, it is also possible to supply power stored in the second battery 22 to the second automatic driving system 23 (backup can be performed).

FIG. 2B indicates a case where the second battery 22 is in a first state where the stored power amount thereof is equal to or larger than a predetermined first threshold value. In this first state, the switching element S1 is controlled by the control section 121 so as to be subjected to the OFF operation. In this control state, a charging path from the second DC-DC converter 21 to the second battery 22 is disconnected so that charging of the second battery 22 by power outputted from the second DC-DC converter 21 is disabled (charging is prohibited). Therefore, for example, the second battery 22 in a fully charged state where the stored power amount thereof is equal to or larger than the first threshold value, can be prevented from being further charged. Meanwhile, in this control state, a discharging path from the second battery 22 to the second automatic driving system 23 is secured by the diode D1, and thus the second battery 22 can be caused to swiftly function as a backup power supply for operating the second automatic driving system 23 when necessary (backup can be performed).

[Operations and Effects]

In the above-described redundant power supply system 1 according to the first embodiment of the present invention, on a path from the second DC-DC converter 21 to the second battery 22, the switching element S1 and the diode D1 which performs rectification in the direction opposite to the path are provided. When the second battery 22 is in the first state in terms of the stored power amount thereof, the switching element S1 is turned off to disconnect the charging path, so that only the discharging path extending via the diode D1 is formed.

Accordingly, the second battery 22 in the fully charged state where the stored power amount thereof is equal to or larger than the first threshold value can be prevented from being overcharged, and the second battery 22 can be caused to swiftly function as a backup power supply for operating the second automatic driving system 23 when necessary.

Second Embodiment

[Configuration]

Figure 3:
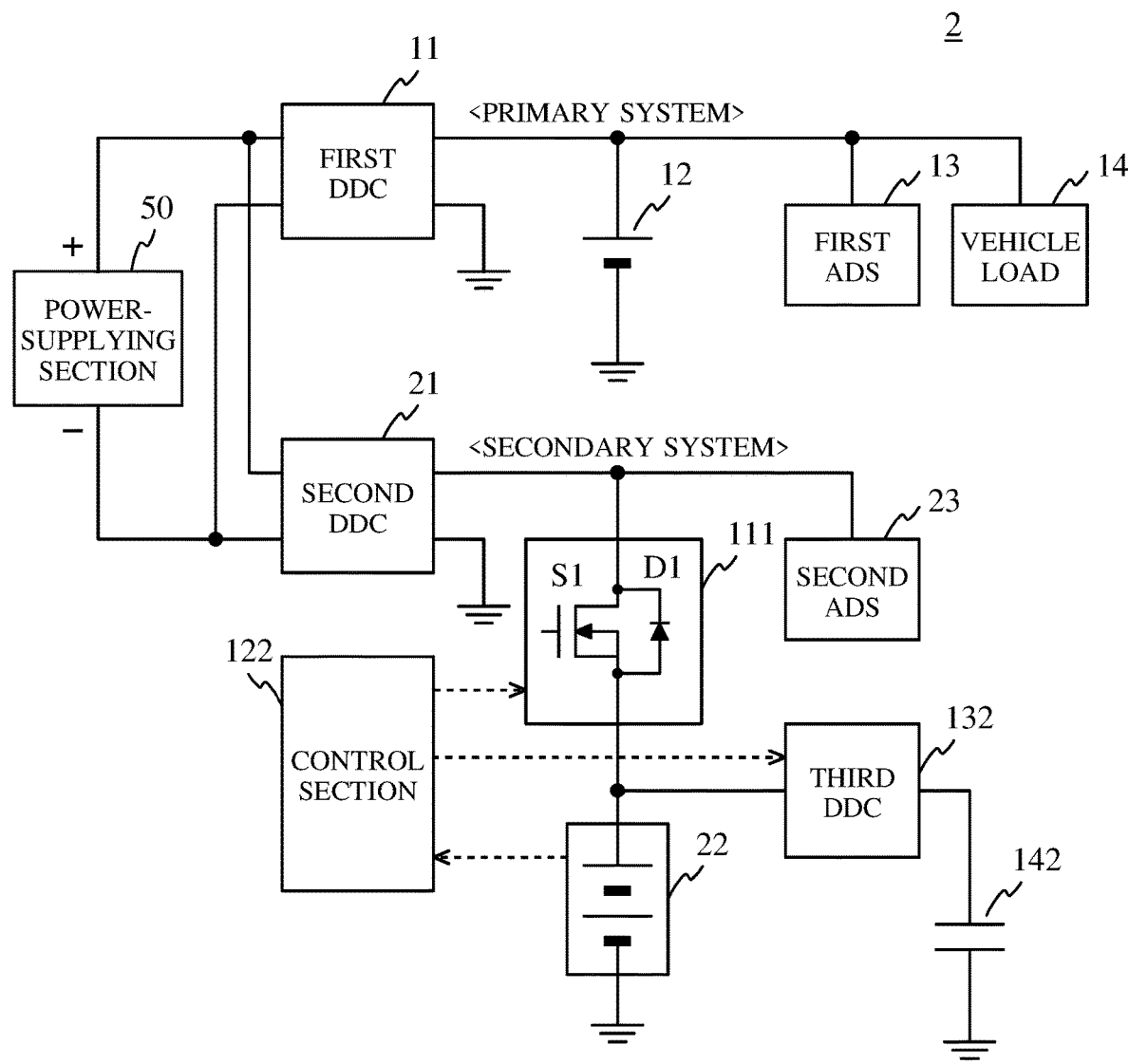
FIG. 3 is a block diagram indicating a schematic configuration of a redundant power supply system according to a second embodiment.

FIG. 3 is a block diagram indicating a schematic configuration of a redundant power supply system 2 according to a second embodiment of the present invention. The redundant power supply system 2 exemplified in FIG. 3 is different in configuration from the above-described redundant power supply system 1 according to the first embodiment in that a third DC-DC converter (DDC) 132 and a power storage section 142 are additionally provided and the control section 121 is replaced by a control section 122 different therefrom in control. The other components of the redundant power supply system 2 are identical to those of the above-described redundant power supply system 1. Thus, these components are denoted by the same reference characters, and the description thereof will be omitted.

The third DC-DC converter 132 is connected between the power storage section 142 and a connection point between the battery protection circuit 111 and the second battery 22. The third DC-DC converter 132 is configured to be able to, in accordance with control by the control section 122, discharge a part of power stored in the second battery 22 to the power storage section 142, and return the power, which is stored in the power storage section 142 as a result of the discharge, to the second battery 22 side so as to charge the second battery 22.

The power storage section 142 is a power storage element, e.g., a capacitor, configured to be able to charge/discharge power. The power storage section 142 may be a lead battery, a lithium-ion battery, or the like as long as being configured to be able to charge/discharge power.

The control section 122 is implemented by, for example, a microcomputer. As can the above-described control section 121 in the first embodiment, the control section 122 can monitor the power storage state of the second battery 22, and control the ON and OFF operations of the battery protection circuit 111 on the basis of this power storage state. Furthermore, the control section 122 can control the third DC-DC converter 132 as follows in order to determine the deterioration state of the second battery 22.

[Control]

Figure 4A:
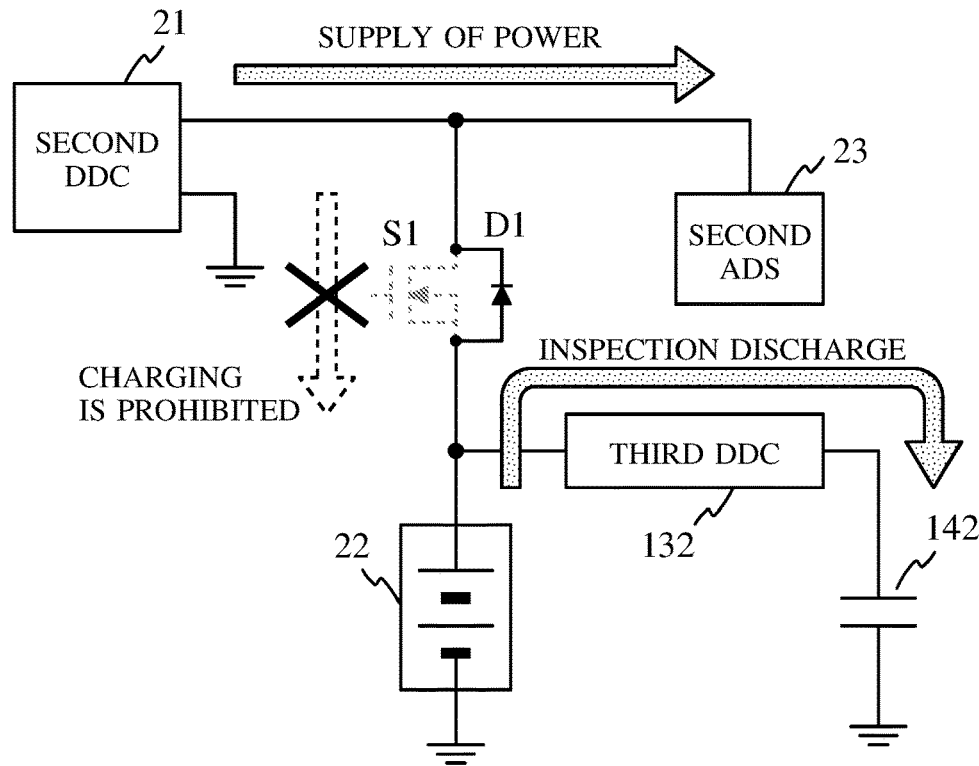
FIG. 4A and FIG. 4B are diagrams for explaining states of the battery protection circuit controlled by a control section in FIG. 3.
Figure 4B:
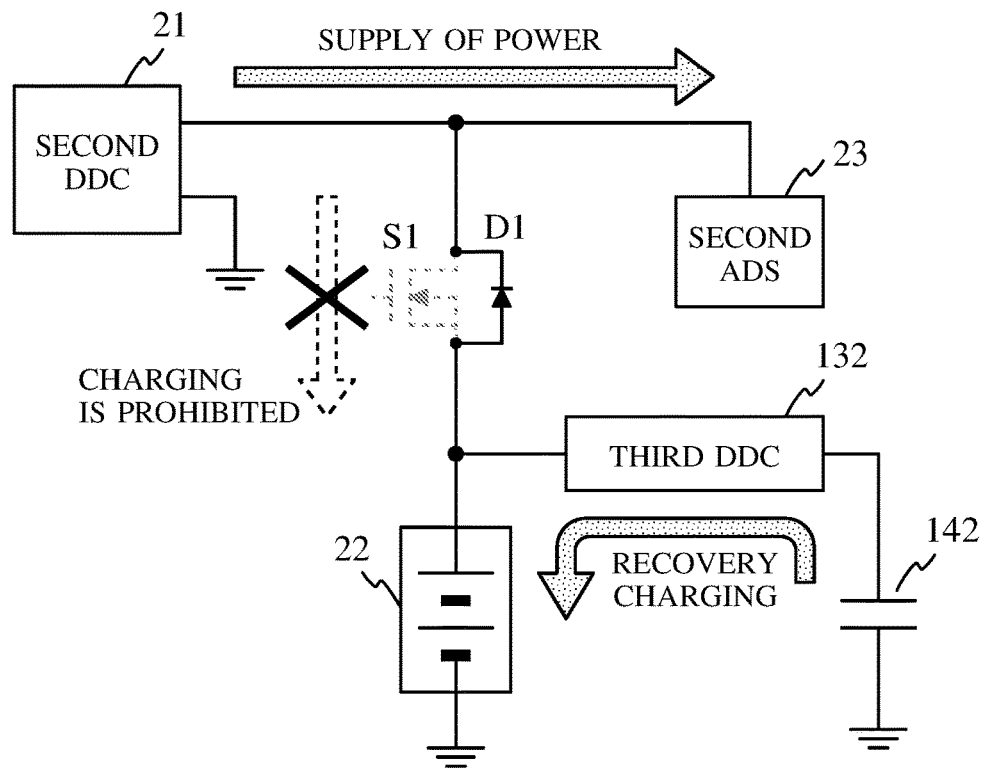

Next, control by the secondary-system power supply device of the redundant power supply system 2 according to the second embodiment will be described also with reference to FIG. 4A and FIG. 4B. FIG. 4A and FIG. 4B indicate states of the battery protection circuit 111 and the third DC-DC converter 132 controlled by the control section 122 which is not shown therein.

FIG. 4A indicates a case where the second battery 22 is in the above-described first state in terms of the stored power amount thereof. In this first state, the control section 122 instructs the third DC-DC converter 132 to perform inspection discharge. The inspection discharge is a process of discharging a part of power stored in the second battery 22 to the power storage section 142. Through this inspection discharge, the control section 122 can determine the deterioration state of the second battery 22 on the basis of an internal resistance value of the second battery 22 estimated from: the difference in the voltage value of the second battery 22 between before and after the discharge; and a discharge current value. In the first state, the inspection discharge can be performed at an arbitrary timing and an arbitrary interval.

Also FIG. 4B indicates a case where the second battery 22 is in the first state in terms of the stored power amount thereof. When the deterioration state of the second battery 22 is determined through the inspection discharge, the control section 122 instructs the third DC-DC converter 132 to perform recovery charging. The recovery charging is a process in which power having been moved from the second battery 22 to the power storage section 142 at the time of the inspection discharge is recovered by the second battery 22. With this recovery charging, power for determining the deterioration state of the second battery 22 is prevented from being wasted.

[Operations and Effects]

The above-described redundant power supply system 2 according to the second embodiment of the present invention, includes: the power storage section 142; and the third DC-DC converter 132 for discharging a part of power stored in the second battery 22 to the power storage section 142. When the charging path from the second DC-DC converter 21 is disconnected, discharge from the second battery 22 to the power storage section 142 is performed and the deterioration state of the second battery 22 is determined.

Accordingly, the discharge can be performed with use of the power storage section 142 without being influenced by a charging action performed on the second battery 22 by the second DC-DC converter 21, whereby the deterioration state of the second battery 22 can be accurately determined.

Third Embodiment

[Configuration]

Figure 5:
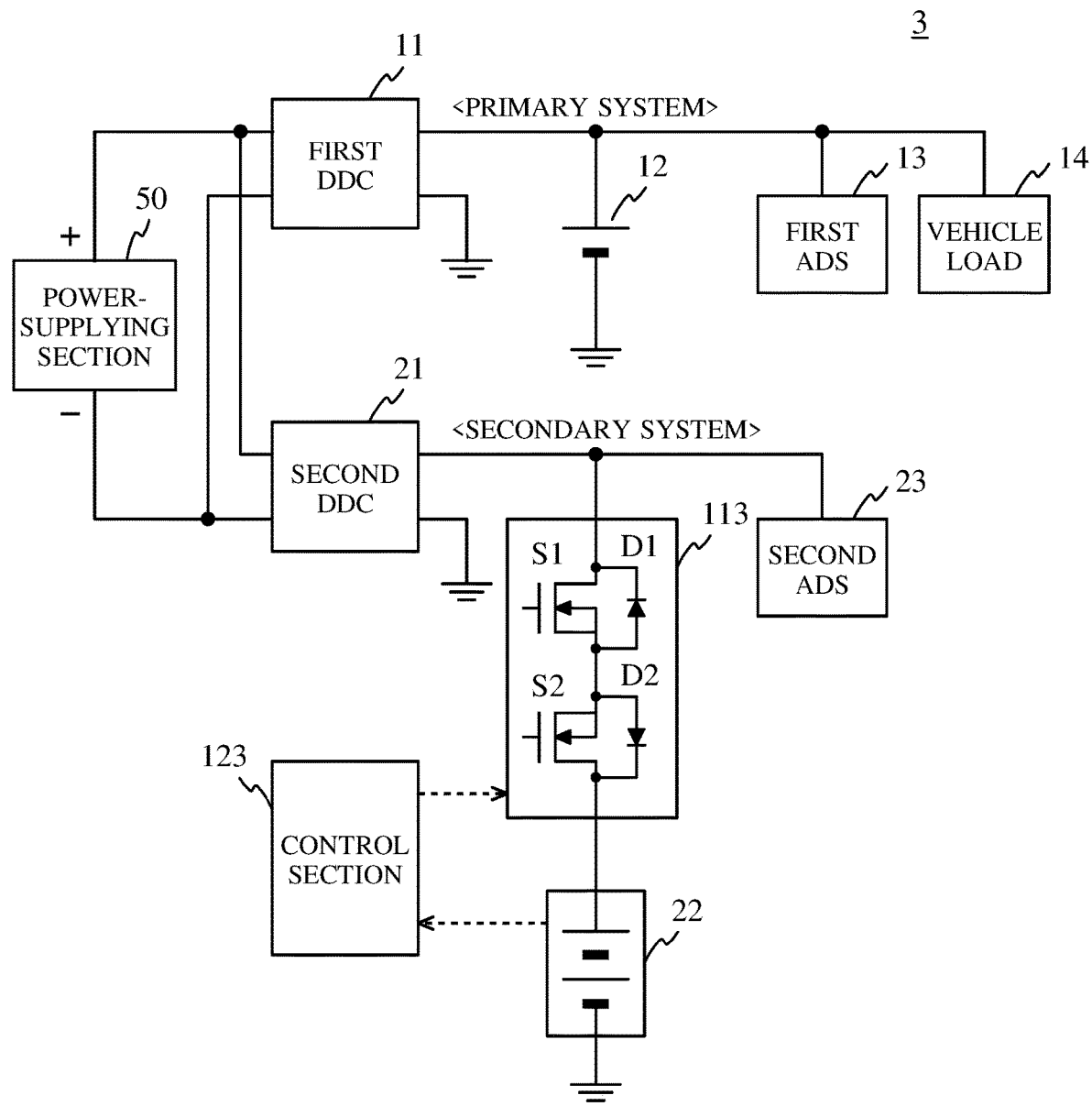
FIG. 5 is a block diagram indicating a schematic configuration of a redundant power supply system according to a third embodiment.

FIG. 5 is a block diagram indicating a schematic configuration of a redundant power supply system 3 according to a third embodiment of the present invention. The redundant power supply system 3 exemplified in FIG. 5 is different in configuration from the above-described redundant power supply system 1 according to first embodiment in that the battery protection circuit 111 is replaced by a battery protection circuit 113 and the control section 121 is replaced by a control section 123. The other components of the redundant power supply system 3 are identical to those of the above-described redundant power supply system 1. Thus, these components are denoted by the same reference characters, and the description thereof will be omitted.

The battery protection circuit 113 is a relay circuit that is interposed between the second DC-DC converter 21 and the second battery 22, and that is for preventing the second battery 22 from being overcharged and overdischarged. The term "overcharged" refers to a state where the second battery 22 is further charged from the fully charged state where the stored power amount of the second battery 22 is equal to or larger than the predetermined first threshold value. The term "overdischarged" refers to a state where the second battery 22 is further discharged from a nearly-discharged state where the stored power amount of the second battery 22 is equal to or smaller than a predetermined second threshold value which is smaller than the first threshold value.

The battery protection circuit 113 is composed of: the switching element S1 and a switching element S2 which are interposed between the second DC-DC converter 21 and the second battery 22; the diode D1 which is connected in parallel to the switching element S1 and which performs rectification in a direction from the second battery 22 to the second DC-DC converter 21; and a diode D2 which is connected in parallel to the switching element S2 and which performs rectification in a direction from the second DC-DC converter 21 to the second battery 22. In response to control by the control section 123, the switching element S1 and the switching element S2 each perform switching between the state of the ON operation (conduction) and the state of the OFF operation (non-conduction). In FIG. 5, as the battery protection circuit 113, an N-channel type MOSFET having a body diode formed between the source and the drain is used, for example.

The control section 123 is implemented by, for example, a microcomputer. The control section 123 can monitor the power storage state of the second battery 22 by sensing a voltage, a temperature, or the like, and control the ON and OFF operations of the battery protection circuit 113 as follows on the basis of this power storage state.

[Control]

Figure 6A:
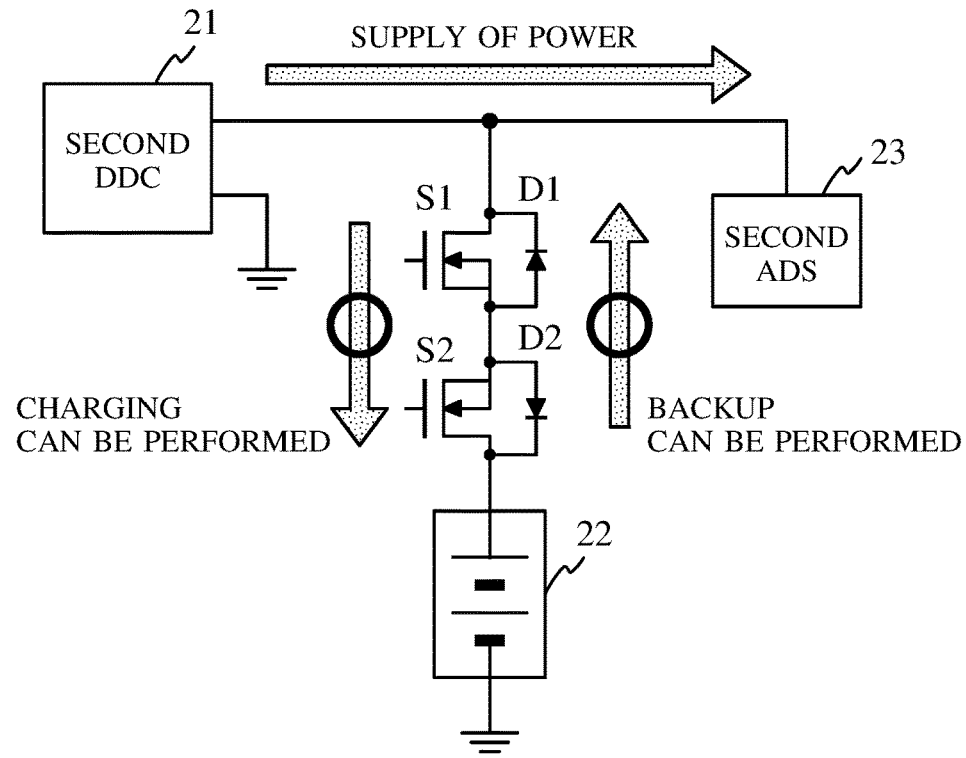
FIG. 6A, FIG. 6B, and FIG. 6C are diagrams for explaining states of a battery protection circuit controlled by a control section in FIG. 5.
Figure 6B:
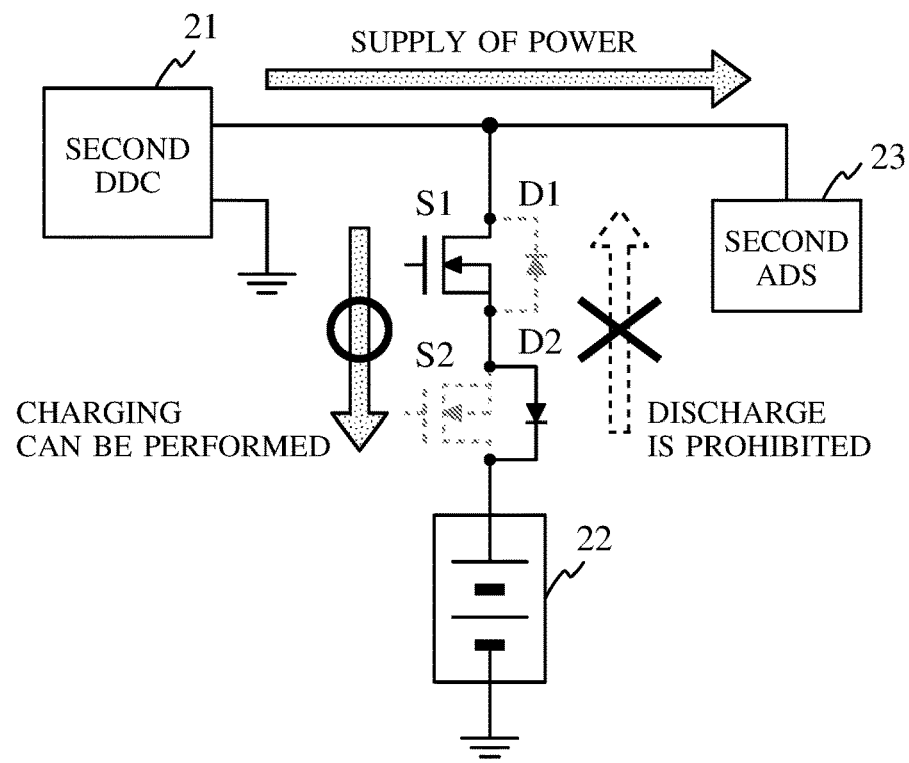
Figure 6C:
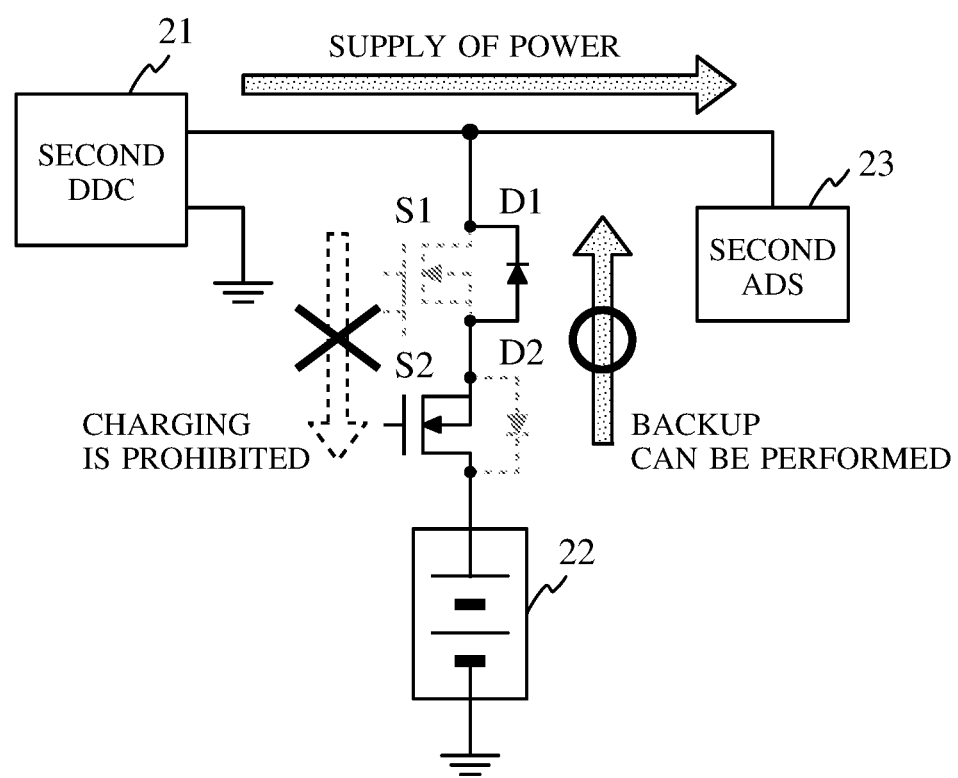

Next, control by the secondary-system power supply device of the redundant power supply system 3 according to the third embodiment will be described also with reference to FIG. 6A to FIG. 6C. FIG. 6A to FIG. 6C indicate states of the battery protection circuit 113 controlled by the control section 123 which is not shown therein.

FIG. 6A indicates a case where the second battery 22 is in a normal state in terms of the stored power amount thereof. The normal state refers to a state which is neither the above-described first state nor a second state which is described later. In this normal state, both the switching element S1 and the switching element S2 are controlled by the control section 123 so as to be subjected to the ON operation. In this control state, power outputted from the second DC-DC converter 21 is supplied to the second automatic driving system 23, and is used for charging of the second battery 22 (charging can be performed). In addition, in this control state, it is also possible to supply power stored in the second battery 22 to the second automatic driving system 23 (backup can be performed).

FIG. 6B indicates a case where the second battery 22 is in a second state where the stored power amount thereof is equal to or smaller than a predetermined second threshold value which is smaller than the above-described first threshold value. In this second state, the control section 123 performs control such that the switching element S1 is subjected to the ON operation and the switching element S2 is subjected to the OFF operation. In this control state, the discharging path from the second battery 22 to the second DC-DC converter 21 is disconnected so that the discharge of power from the second battery 22 to the second automatic driving system 23 is disabled (discharge is prohibited). Therefore, for example, the second battery 22 in a nearly-discharged state can be prevented from being further discharged. Meanwhile, in this control state, the charging path from the second DC-DC converter 21 to the second battery 22 is secured by the switching element S1 and the diode D2, and thus the second battery 22 can be charged until being fully charged (charging can be performed).

FIG. 6C indicates a case where the second battery 22 is in the first state where the stored power amount thereof is equal to or larger than the above-described first threshold value. In this first state, the control section 123 performs control such that the switching element S1 is subjected to the OFF operation and the switching element S2 is subjected to the ON operation. In this control state, the charging path from the second DC-DC converter 21 to the second battery 22 is disconnected so that charging of the second battery 22 by power outputted from the second DC-DC converter 21 is disabled (charging is prohibited). Therefore, for example, the second battery 22 in the fully charged state where the stored power amount thereof is equal to or larger than the first threshold value, can be prevented from being further charged. Meanwhile, in this control state, the discharging path from the second battery 22 to the second automatic driving system 23 is secured by the switching element S2 and the diode D1, and thus the second battery 22 can be caused to swiftly function as a backup power supply for operating the second automatic driving system 23 when necessary (backup can be performed).

[Operations and Effects]

In the above-described redundant power supply system 3 according to the third embodiment of the present invention, two switching elements, i.e., the switching elements S1 and S2, and two diodes, i.e., the diodes D1 and D2 which perform rectification in opposite directions, are provided between the second DC-DC converter 21 and the second battery 22. When the second battery 22 is in the first state in terms of the stored power amount thereof, the switching element S1 is turned off so as to disconnect the charging path, so that only a discharging path extending via the switching element S2 and the diode D1 is formed. When the second battery 22 is in the second state in terms of the stored power amount thereof, the switching element S2 is turned off so as to disconnect the discharging path, so that only a charging path extending via the switching element S1 and the diode D2 is formed.

Accordingly, the second battery 22 in the fully charged state where the stored power amount thereof is equal to or larger than the first threshold value can be prevented from being overcharged, and the second battery 22 can be caused to swiftly function as a backup power supply for operating the second automatic driving system 23 when necessary. Furthermore, the second battery 22 in the nearly-discharged state can be prevented from being overdischarged.

Fourth Embodiment

[Configuration]

Figure 7:
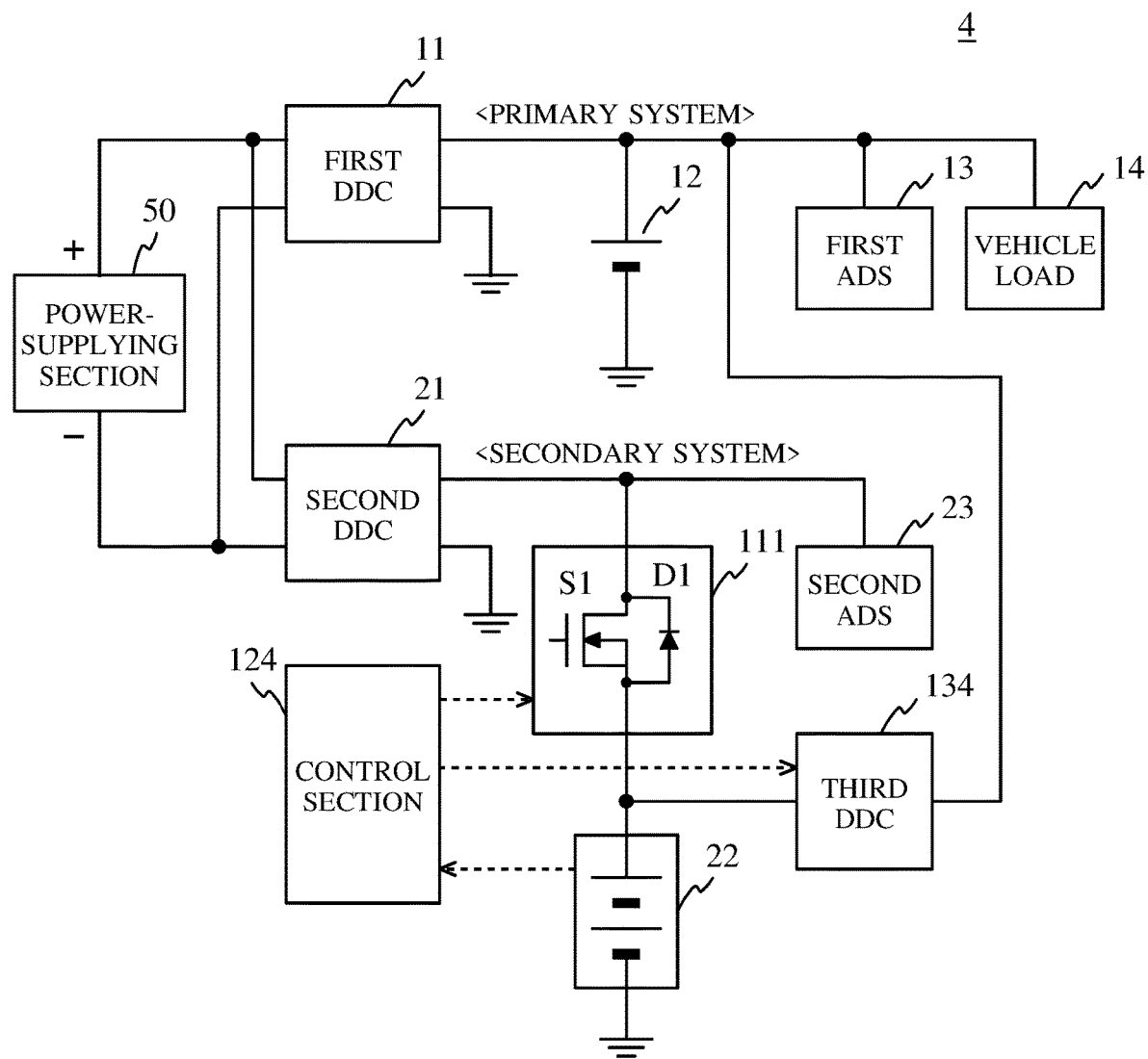
FIG. 7 is a block diagram indicating a schematic configuration of a redundant power supply system according to a fourth embodiment.

FIG. 7 is a block diagram indicating a schematic configuration of a redundant power supply system 4 according to a fourth embodiment of the present invention. The redundant power supply system 4 exemplified in FIG. 7 is different in configuration from the above-described redundant power supply system 1 according to the first embodiment in that a third DC-DC converter (DDC) 134 is additionally provided and the control section 121 is replaced by a control section 124 different therefrom in control. The other components of the redundant power supply system 4 are identical to those of the above-described redundant power supply system 1. Thus, these components are denoted by the same reference characters, and the description thereof will be omitted.

The third DC-DC converter 134 is connected between: the connection point between the battery protection circuit 111 and the second battery 22; and a connection point between the first DC-DC converter 11 and the first battery 12 in the primary system. The third DC-DC converter 134 is configured to be able to discharge a part of power stored in the second battery 22 to the first battery 12 in accordance with control by the control section 124.

The control section 124 is implemented by, for example, a microcomputer. As can the above-described control section 121 in the first embodiment, the control section 124 can monitor the power storage state of the second battery 22, and control the ON and OFF operations of the battery protection circuit 111 on the basis of this power storage state. Furthermore, the control section 124 can control the third DC-DC converter 134 as follows in order to determine the deterioration state of the second battery 22.

[Control]

Figure 8:
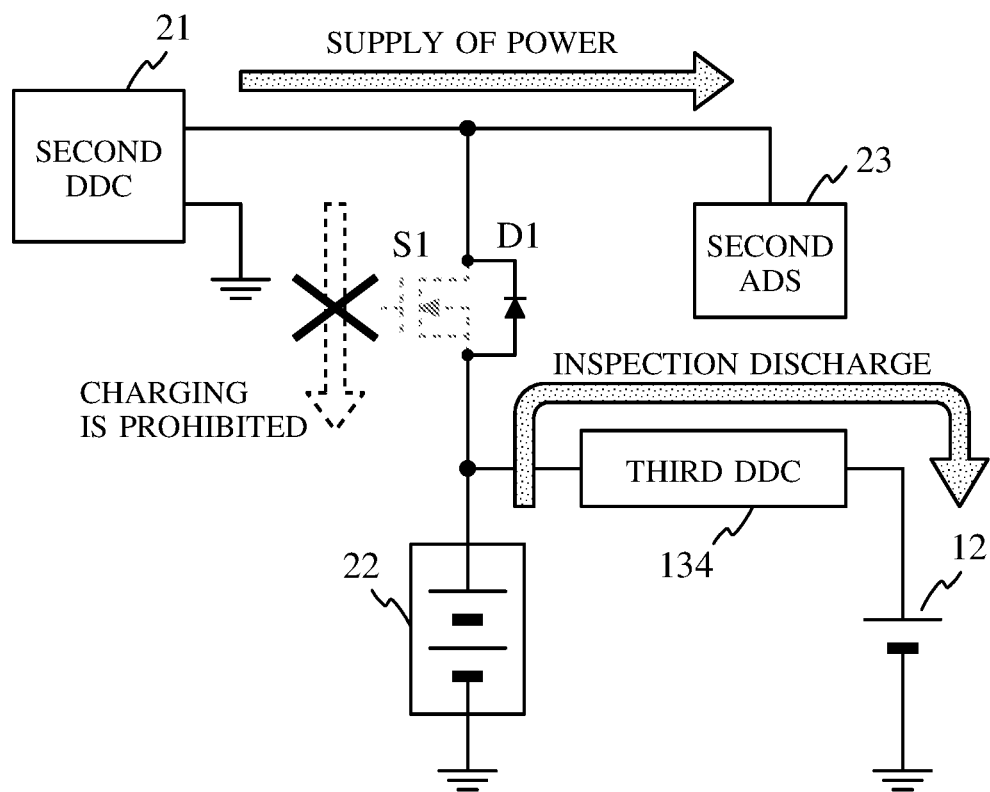
FIG. 8 is a diagram for explaining a state of the battery protection circuit controlled by a control section in FIG. 7.

Next, control by the secondary-system power supply device of the redundant power supply system 4 according to the fourth embodiment will be described also with reference to FIG. 8. FIG. 8 indicates a state of the battery protection circuit 111 and the third DC-DC converter 134 controlled by the control section 124 which is not shown therein.

FIG. 8 indicates a case where the second battery 22 is in the above-described first state in terms of the stored power amount thereof. In this first state, the control section 124 instructs the third DC-DC converter 134 to perform inspection discharge. The inspection discharge refers to a process of discharging a part of power stored in the second battery 22 to the first battery 12. Through this inspection discharge, the control section 124 can determine the deterioration state of the second battery 22 on the basis of an internal resistance value of the second battery 22 estimated from: the difference in the voltage value of the second battery 22 between before and after the discharge; and a discharge current value. In the first state, the inspection discharge can be performed at an arbitrary timing and an arbitrary interval.

[Operations and Effects]

The above-described redundant power supply system 4 according to the fourth embodiment of the present invention, includes the third DC-DC converter 134 for discharging a part of power stored in the second battery 22 to the first battery 12. When the charging path from the second DC-DC converter 21 is disconnected, the discharge from the second battery 22 to the first battery 12 is performed and the deterioration state of the second battery 22 is determined.

Accordingly, the discharge can be performed with use of the first battery 12 without being influenced by the charging action performed on the second battery 22 by the second DC-DC converter 21, whereby the deterioration state of the second battery 22 can be accurately determined. In addition, since the discharge destination is the first battery 12, the value of the current to be discharged for the inspection can be set to be larger than the value of the current to be discharged to the power storage section 142 described in the above-described second embodiment, whereby the deterioration state of the second battery 22 can be determined with a higher accuracy. Furthermore, since the discharge destination is the first battery 12, the power subjected to the inspection discharge can be efficiently used in the primary system, whereby it is possible to eliminate time and effort to recover the power as in the case where the power storage section 142 is used.

OTHER EMBODIMENTS

The battery protection circuit 111 in the redundant power supply system 2 according to the second embodiment and the redundant power supply system 4 according to the fourth embodiment, may be replaced by the battery protection circuit 113 explained in the description of the redundant power supply system 3 according to the third embodiment.

While the invention has been described in detail, the foregoing description is in all aspects illustrative and not restrictive. It will be understood that numerous other modifications and variations can be devised without departing from the scope of the invention.

What is claimed is:

1. A redundant power supply system in which a predetermined power is supplied via a first DC-DC converter to a first battery and a first load of a primary system, and the predetermined power is supplied via a second DC-DC converter to a second battery and a second load of a secondary system independent of the primary system,
the redundant power supply system comprising:
a first switching element interposed between the second DC-DC converter and the second battery;
a first diode connected in parallel to the first switching element and configured to perform rectification in a direction from the second battery toward the second DC-DC converter; and
a control section configured to turn off the first switching element when the second battery is in a first state where a stored power amount thereof is equal to or larger than a predetermined first threshold value, and to turn on the first switching element when the second battery is in a state other than the first state.

2. The redundant power supply system according to claim 1, further comprising:
a second switching element interposed between the second DC-DC converter and the second battery so as to be connected in series to the first switching element; and
a second diode connected in parallel to the second switching element and configured to perform rectification in a direction from the second DC-DC converter toward the second battery, wherein
the control section
turns off the second switching element when the second battery is in a second state where the stored power amount thereof is equal to or smaller than a predetermined second threshold value which is smaller than the first threshold value, and
turns on the second switching element when the second battery is in a state other than the second state.

3. The redundant power supply system according to claim 1, further comprising:
a power storage section; and
a third DC-DC converter via which the second battery and the power storage section are connected to each other so as to be chargeable and dischargeable, wherein,
in the first state where the first switching element is turned off, the control section causes the third DC-DC converter to discharge, with use of the power storage section, a part of power stored in the second battery, thereby determining a deterioration state of the second battery.

4. The redundant power supply system according to claim 1, further comprising a third DC-DC converter via which the second battery and the first battery are connected to each other so as to be chargeable and dischargeable, wherein,
in the first state where the first switching element is turned off, the control section causes the third DC-DC converter to discharge, with use of the first battery, a part of power stored in the second battery, thereby determining a deterioration state of the second battery.

5. The redundant power supply system according to claim 1, wherein
a structure in which the first switching element and the first diode are connected in parallel, and a structure in which the second switching element and the second diode are connected in parallel, are each implemented by a field effect transistor having a body diode formed between a source and a drain.

6. The redundant power supply system according to claim 2, wherein
a structure in which the first switching element and the first diode are connected in parallel, and a structure in which the second switching element and the second diode are connected in parallel, are each implemented by a field effect transistor having a body diode formed between a source and a drain.

7. The redundant power supply system according to claim 3, wherein
a structure in which the first switching element and the first diode are connected in parallel, and a structure in which the second switching element and the second diode are connected in parallel, are each implemented by a field effect transistor having a body diode formed between a source and a drain.

8. The redundant power supply system according to claim 4, wherein
a structure in which the first switching element and the first diode are connected in parallel, and a structure in which the second switching element and the second diode are connected in parallel, are each implemented by a field effect transistor having a body diode formed between a source and a drain.

9. The redundant power supply system according to claim 2, further comprising:
a power storage section; and
a third DC-DC converter via which the second battery and the power storage section are connected to each other so as to be chargeable and dischargeable, wherein,
in the first state where the first switching element is turned off, the control section causes the third DC-DC converter to discharge, with use of the power storage section, a part of power stored in the second battery, thereby determining a deterioration state of the second battery.

10. The redundant power supply system according to claim 2, further comprising a third DC-DC converter via which the second battery and the first battery are connected to each other so as to be chargeable and dischargeable, wherein,
in the first state where the first switching element is turned off, the control section causes the third DC-DC converter to discharge, with use of the first battery, a part of power stored in the second battery, thereby determining a deterioration state of the second battery.

11. The redundant power supply system according to claim 9, wherein
 a structure in which the first switching element and the first diode are connected in parallel, and a structure in which the second switching element and the second diode are connected in parallel, are each implemented by a field effect transistor having a body diode formed between a source and a drain.

12. The redundant power supply system according to claim 10, wherein
 a structure in which the first switching element and the first diode are connected in parallel, and a structure in which the second switching element and the second diode are connected in parallel, are each implemented by a field effect transistor having a body diode formed between a source and a drain.

\* \* \* \* \*